United States Patent
Butcher et al.

(10) Patent No.: US 9,223,411 B2
(45) Date of Patent: *Dec. 29, 2015

(54) USER INTERFACE WITH PARALLAX ANIMATION

(75) Inventors: Larry R. Butcher, Seattle, WA (US); Jonathan D. Friedman, Seattle, WA (US); Chad Aron Voss, Seattle, WA (US); Michael J. Kruzeniski, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 496 days.

This patent is subject to a terminal disclaimer.

(21) Appl. No.: 13/461,656

(22) Filed: May 1, 2012

(65) Prior Publication Data

US 2012/0212495 A1 Aug. 23, 2012

Related U.S. Application Data

(63) Continuation of application No. 12/484,845, filed on Jun. 15, 2009, now Pat. No. 8,250,494.

(60) Provisional application No. 61/107,921, filed on Oct. 23, 2008, provisional application No. 61/107,945, filed on Oct. 23, 2008, provisional application No. 61/107,935, filed on Oct. 23, 2008.

(51) Int. Cl.
*G06F 3/02* (2006.01)
*G06F 3/0482* (2013.01)
(Continued)

(52) U.S. Cl.
CPC ............ *G06F 3/0219* (2013.01); *G06F 3/0227* (2013.01); *G06F 3/0236* (2013.01);
(Continued)

(58) Field of Classification Search
CPC ... G02B 27/2214; G06T 13/00; G06F 3/0482; G06F 3/0485; G06F 3/04883; G06F 17/017; H04W 64/00; H04W 8/245; H04W 72/04
USPC ......... 715/782, 797, 840, 848, 849, 863, 702; 345/473, 626; 709/217; 707/803
See application file for complete search history.

(56) References Cited

U.S. PATENT DOCUMENTS 5,189,732 A 2/1993 Kondo
5,258,748 A 11/1993 Jones
(Continued)

FOREIGN PATENT DOCUMENTS

CA 2363978 5/2003
CN 1749936 3/2006
(Continued)

OTHER PUBLICATIONS

"Final Office Action", U.S. Appl. No. 12/480,969, Feb. 21, 2014, 21 pages.
(Continued)

*Primary Examiner* — Andrew Tank
(74) *Attorney, Agent, or Firm* — Bryan Webster; Sergey Lamansky; Micky Minhas

(57) ABSTRACT

User interface animation techniques are described. In an implementation, an input having a velocity is detected that is directed to one or more objects in a user interface. A visual presentation is generated that is animated so a first object in the user interface moves in parallax with respect to a second object. The presentation is displayed so the first object appears to moves at a rate that corresponds to the velocity.

20 Claims, 5 Drawing Sheets

(51) Int. Cl.

| | | |
|---|---|---|
| *G06F 3/0488* | (2013.01) | |
| *G06F 17/30* | (2006.01) | |
| *G06Q 30/04* | (2012.01) | |
| *G06Q 30/06* | (2012.01) | |
| *H04M 1/725* | (2006.01) | |
| *G06F 3/041* | (2006.01) | |
| *G06F 3/0485* | (2013.01) | |
| *G06F 3/023* | (2006.01) | |
| *G06F 3/044* | (2006.01) | |
| *H04W 4/02* | (2009.01) | |
| *H04W 8/24* | (2009.01) | |
| *H04W 64/00* | (2009.01) | |
| *H04W 72/04* | (2009.01) | |

(52) U.S. Cl.
CPC ............... *G06F 3/041* (2013.01); *G06F 3/044* (2013.01); *G06F 3/0412* (2013.01); *G06F 3/0482* (2013.01); *G06F 3/0485* (2013.01); *G06F 3/0488* (2013.01); *G06F 3/04883* (2013.01); *G06F 17/30864* (2013.01); *G06F 17/30867* (2013.01); *G06Q 30/04* (2013.01); *G06Q 30/0601* (2013.01); *H04M 1/7258* (2013.01); *H04M 1/72569* (2013.01); *H04M 1/72583* (2013.01); *G06F 3/0202* (2013.01); *G06F 2203/04807* (2013.01); *H04W 4/02* (2013.01); *H04W 8/245* (2013.01); *H04W 64/00* (2013.01); *H04W 72/04* (2013.01)

(56) References Cited

U.S. PATENT DOCUMENTS

| | | | |
|---|---|---|---|
| 5,404,442 | A | 4/1995 | Foster et al. |
| 5,463,725 | A | 10/1995 | Henckel |
| 5,515,495 | A | 5/1996 | Ikemoto |
| 5,574,836 | A | 11/1996 | Broemmelsiek |
| 5,675,329 | A | 10/1997 | Barker |
| 5,754,178 | A | 5/1998 | Johnston, Jr. et al. |
| 5,860,073 | A | 1/1999 | Ferrel et al. |
| 5,905,492 | A | 5/1999 | Straub et al. |
| 5,914,720 | A | 6/1999 | Maples et al. |
| 5,963,204 | A | 10/1999 | Ikeda et al. |
| 6,008,816 | A | 12/1999 | Eisler |
| 6,184,879 | B1 | 2/2001 | Minemura et al. |
| 6,317,142 | B1 | 11/2001 | Decoste et al. |
| 6,385,630 | B1 | 5/2002 | Ejerhed |
| 6,396,963 | B2 | 5/2002 | Shaffer |
| 6,424,338 | B1 | 7/2002 | Anderson |
| 6,507,643 | B1 | 1/2003 | Groner |
| 6,570,582 | B1 | 5/2003 | Sciammarella et al. |
| 6,642,944 | B2 | 11/2003 | Conrad et al. |
| 6,662,023 | B1 | 12/2003 | Helle |
| 6,697,825 | B1 | 2/2004 | Underwood et al. |
| 6,784,925 | B1 | 8/2004 | Tomat |
| 6,865,297 | B2 | 3/2005 | Loui |
| 6,876,312 | B2 | 4/2005 | Yu |
| 6,904,597 | B2 | 6/2005 | Jin |
| 6,961,731 | B2 | 11/2005 | Holbrook |
| 6,983,310 | B2 | 1/2006 | Rouse |
| 6,987,991 | B2 | 1/2006 | Nelson |
| 7,007,238 | B2 | 2/2006 | Glaser |
| 7,013,041 | B2 | 3/2006 | Miyamoto |
| 7,058,955 | B2 | 6/2006 | Porkka |
| 7,065,385 | B2 | 6/2006 | Jarrad et al. |
| 7,065,386 | B1 | 6/2006 | Smethers |
| 7,111,044 | B2 | 9/2006 | Lee |
| 7,133,707 | B1 | 11/2006 | Rak |
| 7,133,859 | B1 | 11/2006 | Wong |
| 7,139,800 | B2 | 11/2006 | Bellotti et al. |
| 7,158,123 | B2 | 1/2007 | Myers et al. |
| 7,178,111 | B2 | 2/2007 | Glein et al. |
| 7,197,702 | B2 | 3/2007 | Niyogi et al. |
| 7,213,079 | B2 | 5/2007 | Narin |
| 7,216,588 | B2 | 5/2007 | Suess |
| 7,249,326 | B2 | 7/2007 | Stoakley et al. |
| 7,280,097 | B2 | 10/2007 | Chen |
| 7,283,620 | B2 | 10/2007 | Adamczyk |
| 7,289,806 | B2 | 10/2007 | Morris et al. |
| 7,296,184 | B2 | 11/2007 | Derks et al. |
| 7,336,263 | B2 | 2/2008 | Valikangas |
| 7,369,647 | B2 | 5/2008 | Gao et al. |
| 7,388,578 | B2 | 6/2008 | Tao |
| 7,403,191 | B2 | 7/2008 | Sinclair |
| 7,447,520 | B2 | 11/2008 | Scott |
| 7,461,151 | B2 | 12/2008 | Colson et al. |
| 7,469,381 | B2 * | 12/2008 | Ording .......................... 715/702 |
| 7,479,949 | B2 | 1/2009 | Jobs |
| 7,480,870 | B2 | 1/2009 | Anzures |
| 7,483,418 | B2 | 1/2009 | Maurer |
| 7,496,830 | B2 | 2/2009 | Rubin |
| 7,593,995 | B1 | 9/2009 | He et al. |
| 7,606,714 | B2 | 10/2009 | Williams et al. |
| 7,610,563 | B2 | 10/2009 | Nelson et al. |
| 7,614,018 | B1 | 11/2009 | Ohazama et al. |
| 7,619,615 | B1 | 11/2009 | Donoghue |
| 7,640,518 | B2 | 12/2009 | Forlines et al. |
| 7,657,849 | B2 | 2/2010 | Chaudhri et al. |
| 7,671,756 | B2 | 3/2010 | Herz et al. |
| 7,681,138 | B2 | 3/2010 | Grasser et al. |
| 7,702,683 | B1 | 4/2010 | Kirshenbaum |
| 7,730,425 | B2 | 6/2010 | de los Reyes et al. |
| 7,746,388 | B2 | 6/2010 | Jeon |
| 7,755,674 | B2 | 7/2010 | Kaminaga |
| 7,782,332 | B2 | 8/2010 | Nagata |
| 7,782,339 | B1 * | 8/2010 | Hobbs et al. .................. 345/626 |
| 7,792,876 | B2 * | 9/2010 | Easwar .......................... 707/803 |
| 7,834,861 | B2 | 11/2010 | Lee |
| 7,877,707 | B2 | 1/2011 | Westerman et al. |
| 7,889,180 | B2 | 2/2011 | Byun et al. |
| 7,903,115 | B2 * | 3/2011 | Platzer et al. ................. 345/473 |
| 7,983,718 | B1 | 7/2011 | Roka |
| 8,006,276 | B2 | 8/2011 | Nakagawa et al. |
| 8,074,174 | B2 | 12/2011 | Suzuki et al. |
| 8,086,275 | B2 | 12/2011 | Wykes |
| 8,127,254 | B2 | 2/2012 | Lindberg et al. |
| 8,130,226 | B2 * | 3/2012 | Brunner et al. ............... 345/473 |
| 8,131,808 | B2 | 3/2012 | Aoki et al. |
| 8,175,653 | B2 | 5/2012 | Smuga |
| 8,200,779 | B2 * | 6/2012 | Wei et al. ...................... 709/217 |
| 8,238,526 | B1 | 8/2012 | Seth et al. |
| 8,238,876 | B2 | 8/2012 | Teng |
| 8,250,494 | B2 | 8/2012 | Butcher |
| 8,266,550 | B1 * | 9/2012 | Cleron et al. ................. 715/863 |
| 8,269,736 | B2 | 9/2012 | Wilairat |
| 8,280,901 | B2 | 10/2012 | McDonald |
| 8,289,688 | B2 | 10/2012 | Behar et al. |
| 8,294,715 | B2 | 10/2012 | Patel et al. |
| 8,299,943 | B2 | 10/2012 | Longe |
| 8,355,698 | B2 | 1/2013 | Teng et al. |
| 8,385,952 | B2 | 2/2013 | Friedman et al. |
| 8,411,046 | B2 | 4/2013 | Kruzeniski et al. |
| 8,448,083 | B1 | 5/2013 | Migos et al. |
| 8,548,431 | B2 | 10/2013 | Teng et al. |
| 8,564,461 | B2 | 10/2013 | Rubanovich et al. |
| 8,634,876 | B2 | 1/2014 | Friedman |
| 8,781,533 | B2 | 7/2014 | Wykes et al. |
| 8,892,170 | B2 | 11/2014 | Teng et al. |
| 8,914,072 | B2 | 12/2014 | Smuga et al. |
| 8,970,499 | B2 | 3/2015 | Wykes et al. |
| 2001/0015721 | A1 | 8/2001 | Byun et al. |
| 2001/0022621 | A1 | 9/2001 | Squibbs |
| 2002/0000963 | A1 | 1/2002 | Yoshida et al. |
| 2002/0018051 | A1 | 2/2002 | Singh |
| 2002/0026349 | A1 | 2/2002 | Reilly et al. |
| 2002/0035607 | A1 | 3/2002 | Checkoway |
| 2002/0060701 | A1 | 5/2002 | Naughton et al. |
| 2002/0070961 | A1 | 6/2002 | Xu et al. |
| 2002/0091755 | A1 | 7/2002 | Narin |
| 2002/0128036 | A1 | 9/2002 | Yach et al. |
| 2002/0129061 | A1 | 9/2002 | Swart et al. |
| 2002/0138248 | A1 | 9/2002 | Corston-Oliver et al. |
| 2002/0142762 | A1 | 10/2002 | Chmaytelli et al. |

(56) References Cited

U.S. PATENT DOCUMENTS

| | | |
|---|---|---|
| 2002/0154176 A1 | 10/2002 | Barksdale et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0040300 A1 | 2/2003 | Bodic |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0068543 A1 | 4/2004 | Seifert |
| 2004/0078299 A1 | 4/2004 | Down-Logan et al. |
| 2004/0111673 A1 | 6/2004 | Bowman et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0250217 A1 | 12/2004 | Tojo et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko et al. |
| 2005/0085272 A1 | 4/2005 | Anderson et al. |
| 2005/0114788 A1 | 5/2005 | Fabritius |
| 2005/0143138 A1 | 6/2005 | Lee et al. |
| 2005/0179654 A1 | 8/2005 | Hawkins |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0216300 A1 | 9/2005 | Appelman et al. |
| 2005/0232166 A1 | 10/2005 | Nierhaus |
| 2005/0250547 A1 | 11/2005 | Salman et al. |
| 2005/0273614 A1 | 12/2005 | Ahuja et al. |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0015736 A1 | 1/2006 | Callas et al. |
| 2006/0015812 A1 | 1/2006 | Cunningham |
| 2006/0025220 A1 | 2/2006 | Macauley et al. |
| 2006/0026013 A1 | 2/2006 | Kraft |
| 2006/0059430 A1 | 3/2006 | Bells |
| 2006/0070005 A1 | 3/2006 | Gilbert et al. |
| 2006/0070007 A1 | 3/2006 | Cummins et al. |
| 2006/0074771 A1 | 4/2006 | Kim |
| 2006/0103623 A1 | 5/2006 | Davis |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0199598 A1 | 9/2006 | Lee et al. |
| 2006/0206590 A1 | 9/2006 | Wakasa et al. |
| 2006/0218234 A1 | 9/2006 | Deng et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294396 A1 | 12/2006 | Witman et al. |
| 2007/0005716 A1 | 1/2007 | LeVasseur et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050337 A1 | 3/2007 | Venkataraman et al. |
| 2007/0054679 A1 | 3/2007 | Cho et al. |
| 2007/0061306 A1 | 3/2007 | Pell et al. |
| 2007/0061714 A1 | 3/2007 | Stuple et al. |
| 2007/0067272 A1 | 3/2007 | Flynt |
| 2007/0073718 A1 | 3/2007 | Ramer |
| 2007/0076013 A1 | 4/2007 | Campbell et al. |
| 2007/0079249 A1 | 4/2007 | Pall et al. |
| 2007/0080954 A1 | 4/2007 | Griffin et al. |
| 2007/0082707 A1 | 4/2007 | Flynt et al. |
| 2007/0082708 A1 | 4/2007 | Griffin |
| 2007/0118801 A1 | 5/2007 | Harshbarger et al. |
| 2007/0127638 A1 | 6/2007 | Doulton |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0162850 A1 | 7/2007 | Adler et al. |
| 2007/0171192 A1 | 7/2007 | Seo et al. |
| 2007/0171238 A1 | 7/2007 | Ubillos et al. |
| 2007/0182595 A1 | 8/2007 | Ghasabian |
| 2007/0185847 A1 | 8/2007 | Budzik et al. |
| 2007/0192707 A1 | 8/2007 | Maeda et al. |
| 2007/0192708 A1 | 8/2007 | Lee et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0216651 A1 | 9/2007 | Patel |
| 2007/0225022 A1 | 9/2007 | Satake |
| 2007/0232342 A1 | 10/2007 | Larocca |
| 2007/0233654 A1 | 10/2007 | Karlson et al. |
| 2007/0238488 A1 | 10/2007 | Scott |
| 2007/0247435 A1 | 10/2007 | Benko et al. |
| 2007/0250583 A1 | 10/2007 | Hardy et al. |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen et al. |
| 2007/0262964 A1 | 11/2007 | Zotov et al. |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0009272 A1 | 1/2008 | Toledano |
| 2008/0022560 A1 | 1/2008 | Grimmeisen |
| 2008/0032681 A1 | 2/2008 | West |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0066010 A1 | 3/2008 | Brodersen et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092057 A1 | 4/2008 | Monson et al. |
| 2008/0094370 A1 | 4/2008 | Ording et al. |
| 2008/0102863 A1 | 5/2008 | Hardy |
| 2008/0114535 A1 | 5/2008 | Nesbitt |
| 2008/0120571 A1 | 5/2008 | Chang et al. |
| 2008/0132252 A1 | 6/2008 | Altman et al. |
| 2008/0153551 A1 | 6/2008 | Baek et al. |
| 2008/0155425 A1 | 6/2008 | Murthy et al. |
| 2008/0155437 A1 | 6/2008 | Morris |
| 2008/0162651 A1 | 7/2008 | Madnani |
| 2008/0165132 A1 | 7/2008 | Weiss |
| 2008/0165136 A1 | 7/2008 | Christie et al. |
| 2008/0165163 A1 | 7/2008 | Bathiche |
| 2008/0167058 A1 | 7/2008 | Lee et al. |
| 2008/0168290 A1 | 7/2008 | Jobs et al. |
| 2008/0168403 A1 | 7/2008 | Westerman et al. |
| 2008/0172609 A1 | 7/2008 | Rytivaara |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189658 A1 | 8/2008 | Jeong et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0215980 A1 | 9/2008 | Lee et al. |

(56) References Cited

U.S. PATENT DOCUMENTS

| | | |
|---|---|---|
| 2008/0222560 A1 | 9/2008 | Harrison |
| 2008/0222569 A1 | 9/2008 | Champion |
| 2008/0242362 A1 | 10/2008 | Duarte |
| 2008/0250035 A1 | 10/2008 | Smith et al. |
| 2008/0259042 A1 | 10/2008 | Thorn |
| 2008/0261660 A1 | 10/2008 | Huh et al. |
| 2008/0270558 A1 | 10/2008 | Ma |
| 2008/0295017 A1 | 11/2008 | Tseng et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307364 A1 | 12/2008 | Chaudhri et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2009/0002332 A1 | 1/2009 | Park et al. |
| 2009/0007017 A1 | 1/2009 | Anzures et al. |
| 2009/0012952 A1 | 1/2009 | Fredriksson |
| 2009/0019369 A1 | 1/2009 | Borovsky et al. |
| 2009/0029736 A1 | 1/2009 | Kim et al. |
| 2009/0037413 A1 | 2/2009 | Castell et al. |
| 2009/0037469 A1 | 2/2009 | Kirsch |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070695 A1 | 3/2009 | Oh et al. |
| 2009/0077649 A1 | 3/2009 | Lockhart |
| 2009/0083656 A1 | 3/2009 | Dukhon |
| 2009/0083850 A1 | 3/2009 | Fadell et al. |
| 2009/0085851 A1 | 4/2009 | Lim |
| 2009/0085878 A1 | 4/2009 | Heubel |
| 2009/0089215 A1 | 4/2009 | Newton |
| 2009/0106694 A1 | 4/2009 | Kraft et al. |
| 2009/0109184 A1 | 4/2009 | Kim et al. |
| 2009/0109243 A1 | 4/2009 | Kraft |
| 2009/0111447 A1 | 4/2009 | Nurmi |
| 2009/0117942 A1 | 5/2009 | Boningue et al. |
| 2009/0119606 A1 | 5/2009 | Gilbert |
| 2009/0140061 A1 | 6/2009 | Schultz et al. |
| 2009/0140986 A1 | 6/2009 | Karkkainen et al. |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0170480 A1 | 7/2009 | Lee |
| 2009/0205041 A1 | 8/2009 | Michalske |
| 2009/0228825 A1 | 9/2009 | Van Os et al. |
| 2009/0259971 A1 | 10/2009 | Rankine et al. |
| 2009/0265662 A1 | 10/2009 | Bamford |
| 2009/0284482 A1 | 11/2009 | Chin |
| 2009/0288032 A1 | 11/2009 | Chang et al. |
| 2009/0293014 A1 | 11/2009 | Meuninck et al. |
| 2009/0298547 A1 | 12/2009 | Kim et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315847 A1 | 12/2009 | Fujii |
| 2009/0328101 A1 | 12/2009 | Suomela et al. |
| 2010/0008490 A1 | 1/2010 | Gharachorloo et al. |
| 2010/0023871 A1 | 1/2010 | Bederson et al. |
| 2010/0075628 A1 | 3/2010 | Ye |
| 2010/0079413 A1 | 4/2010 | Kawashima et al. |
| 2010/0087169 A1 | 4/2010 | Lin |
| 2010/0087173 A1 | 4/2010 | Lin |
| 2010/0088634 A1 | 4/2010 | Tsuruta et al. |
| 2010/0100839 A1 | 4/2010 | Tseng et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0167699 A1 | 7/2010 | Sigmund et al. |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0295795 A1 | 11/2010 | Wilairat |
| 2010/0311470 A1 | 12/2010 | Seo et al. |
| 2010/0321403 A1 | 12/2010 | Inadome |
| 2011/0018806 A1 | 1/2011 | Yano |
| 2011/0055773 A1 | 3/2011 | Agarawala et al. |
| 2011/0093778 A1 | 4/2011 | Kim et al. |
| 2011/0231796 A1 | 9/2011 | Vigil |
| 2012/0028687 A1 | 2/2012 | Wykes |
| 2012/0050185 A1 | 3/2012 | Davydov et al. |
| 2012/0179992 A1 | 7/2012 | Smuga |
| 2012/0244841 A1 | 9/2012 | Teng |
| 2013/0102366 A1 | 4/2013 | Teng et al. |
| 2014/0068446 A1 | 3/2014 | Friedman et al. |
| 2014/0068447 A1 | 3/2014 | Yamashita |
| 2014/0094226 A1 | 4/2014 | Friedman et al. |
| 2014/0109005 A1 | 4/2014 | Kruzeniski et al. |
| 2014/0320415 A1 | 10/2014 | Wykes et al. |
| 2015/0040057 A1 | 2/2015 | Smuga et al. |
| 2015/0169079 A1 | 6/2015 | Wykes et al. |

FOREIGN PATENT DOCUMENTS

| | | |
|---|---|---|
| CN | 1936797 | 3/2007 |
| CN | 101047656 | 10/2007 |
| CN | 101127736 | 2/2008 |
| CN | 101228570 | 7/2008 |
| CN | 101296457 | 10/2008 |
| CN | 101308440 | 11/2008 |
| CN | 101311891 | 11/2008 |
| CN | 102197702 | 9/2011 |
| EP | 0583060 | 2/1994 |
| EP | 1469375 | 10/2004 |
| EP | 1752868 | 2/2007 |
| EP | 1959338 | 8/2008 |
| JP | H03246614 | 11/1991 |
| JP | H06242886 | 9/1994 |
| JP | H0897887 | 4/1996 |
| JP | 2001125913 | 5/2001 |
| JP | 2002229906 | 8/2002 |
| JP | 2003076460 | 3/2003 |
| JP | 2004227393 | 8/2004 |
| JP | 2004357257 | 12/2004 |
| JP | 2005517240 | 6/2005 |
| JP | 2005242661 | 9/2005 |
| JP | 2005539432 | 12/2005 |
| JP | 2006139615 | 6/2006 |
| JP | 2006163647 | 6/2006 |
| JP | 2007141249 | 6/2007 |
| JP | 2007243275 | 9/2007 |
| JP | 2007527065 | 9/2007 |
| JP | 2007258893 | 10/2007 |
| JP | 2008148054 | 6/2008 |
| JP | 2008204210 | 9/2008 |
| JP | 2008536196 | 9/2008 |
| JP | 2008257442 | 10/2008 |
| JP | 2009522666 | 6/2009 |
| KR | 200303655 | 2/2003 |
| KR | 20060019198 | 3/2006 |
| KR | 102007003611 | 4/2007 |
| KR | 102007009833 | 10/2007 |
| KR | 20070120368 | 12/2007 |
| KR | 102008002595 | 3/2008 |
| KR | 102008007639 | 8/2008 |

(56) References Cited

FOREIGN PATENT DOCUMENTS

| | | |
|---|---|---|
| KR | 100854333 | 9/2008 |
| KR | 20080084156 | 9/2008 |
| KR | 102008008415 | 9/2008 |
| KR | 102008011391 | 12/2008 |
| KR | 102009004163 | 4/2009 |
| RU | 2254611 | 1/2005 |
| RU | 2308076 | 10/2007 |
| RU | 2345425 | 1/2009 |
| RU | 2347261 | 2/2009 |
| TW | 200404444 | 3/2004 |
| TW | 200828096 | 7/2008 |
| TW | 201023026 | 6/2010 |
| WO | WO-03062976 | 7/2003 |
| WO | WO-03091034 | 11/2003 |
| WO | WO-2004097680 | 11/2004 |
| WO | WO-2005026931 | 3/2005 |
| WO | WO-2005027506 | 3/2005 |
| WO | WO-2006019639 | 2/2006 |
| WO | WO-2007030396 | 3/2007 |
| WO | WO-2007099424 | 9/2007 |
| WO | WO-2007121557 | 11/2007 |
| WO | WO-2007134623 | 11/2007 |
| WO | WO-2008030608 | 3/2008 |
| WO | WO-2008030976 | 3/2008 |
| WO | WO-2008031871 | 3/2008 |
| WO | WO-2008035831 | 3/2008 |
| WO | WO-2008104862 | 9/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |

OTHER PUBLICATIONS

"Foreign Office Action", AU Application No. 2010234909, Mar. 17, 2014, 4 Pages.

"Foreign Office Action", CN Application No. 200980142644.1, Mar. 5, 2014, 7 Pages.

"Foreign Office Action", JP Application No. 2012-511905, Jan. 28, 2014, 6 Pages.

"Foreign Office Action", JP Application No. 2011-533280, Nov. 26, 2013, 4 Pages.

"Foreign Office Action", RU Application No. 2011147058, Feb. 12, 2014, 6 Pages.

"Non-Final Office Action", U.S. Appl. No. 13/418,884, Mar. 10, 2014, 8 pages.

"Non-Final Office Action", U.S. Appl. No. 13/712,777, Mar. 20, 2014, 7 pages.

"Notice of Allowance", U.S. Appl. No. 13/270,111, Mar. 7, 2014, 6 pages.

"Advisory Action", U.S. Appl. No. 12/414,382, (Jan. 20, 2012), 3 pages.

"Advisory Action", U.S. Appl. No. 12/433,605, (Apr. 5, 2012), 3 pages.

"Alltel Adds Dedicated Search Key to Phones", Retrieved from: <http://www.phonescoop.com/news/item.php?n=2159> on Nov. 26, 2008., (Apr. 12, 2007), 2 Pages.

"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007), 11 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008), 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, (Sep. 10, 2008), 4 Pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, (2009), 5 Pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final.pdf>, (Jul. 2008), 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009), 2 pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008), 14 pages.

"Extended European Search Report", European Patent Application No. 09818253.8, (Apr. 10, 2012), 7 pages.

"Final Office Action", U.S. Appl. No. 12/244,545, (Dec. 7, 2011), 16 pages.

"Final Office Action", U.S. Appl. No. 12/413,977, (Nov. 17, 2011), 16 pages.

"Final Office Action", U.S. Appl. No. 12/414,382, (Dec. 23, 2011), 7 pages.

"Final Office Action", U.S. Appl. No. 12/414,476, (Dec. 1, 2011), 20 pages.

"Final Office Action", U.S. Appl. No. 12/433,605, (Feb. 3, 2012), 11 pages.

"Final Office Action", U.S. Appl. No. 12/433,667, (Sep. 13, 2011), 17 pages.

"Final Office Action", U.S. Appl. No. 12/469,458, (Nov. 17, 2011), 15 pages.

"Final Office Action", U.S. Appl. No. 12/469,480, (Feb. 9, 2012), 17 pages.

"Final Office Action", U.S. Appl. No. 12/484,799, (Apr. 30, 2012), 13 pages.

"Final Office Action", U.S. Appl. No. 12/560,081, (Mar. 14, 2012), 16 pages.

"Freeware.mobi", Retrieved from: <http://www.palmfreeware.mobi/download-palette.html> on Nov. 6, 2008, (Oct. 9, 2001), 2 pages.

"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007), 24 pages.

"HTC Shows HTC Snap with Snappy Email Feature", Retrieved from: <http://www.wirelessandmobilenews.com/smartphones/ on May 5, 2009>, (May 4, 2009),10 Pages.

"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.

"International Search Report", Application No. PCT/US2010/028553, Application Filing Date: Mar. 24, 2010,(Nov. 9, 2010), 9 pages.

"Internet Explorer Window Restrictions", Retrieved from: http://technet.microsoft.com/en-us/library/cc759517(WS.10).aspx on Jun. 28, 2011, Microsoft TechNet, 5 pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008), pp. 1-7.

"Keyboard (5)", Retrieved from: <http://landru.uwaterloo.ca/cgi-bin/man.cgi?section=5&topic=keyboard> on Dec. 11, 2008., (Aug. 11, 1997), 8 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005), 5 pages.

(56) References Cited

OTHER PUBLICATIONS

"Kiosk Browser Chrome Customization Firefox 2.x", Retrieved from: <http://stlouis-shopper.com/cgi-bin/mozdev-wiki/.pl?ChromeCustomization> on Oct. 22, 2008 Making_a_new_chrome_for_the_kiosk_browser, Kiosk Project Kiosk Browser Chrome Customization Firefox-2.x,(Aug. 16, 2007), 2 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008), 7 Pages.

"MIDTB Tip Sheet: Book Courier", Retrieved from: <http://www.midtb.org/tipsbookcourier.htm> on Dec. 11, 2008., (Sep. 26, 2005), 6 Pages.

"Mobile/UI/Designs/TouchScreen", Retrieved from: <https://wiki.mozilla.org/Mobile/UI/Designs/TouchScreen> on May 6, 2009., (Feb. 3, 2009), 15 Pages.

"Multi-touch", Retrieved from <http://en.wikipedia.org/wiki/Multi-touch#Microsoft_Surface> on Apr. 24, 2009, (Apr. 17, 2009), 8 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006), 2 Pages.

"Non-Final Office Action", U.S. Appl. No. 12/244,545, (Mar. 27, 2012), 18 pages.

"Non-Final Office Action", U.S. Appl. No. 12/244,545, (Aug. 17, 2011), 15 pages.

"Non-Final Office Action", U.S. Appl. No. 12/413,977, (Jul. 19, 2011), 17 pages.

"Non-Final Office Action", U.S. Appl. No. 12/414,382, (Jul. 26, 2011), 9 pages.

"Non-Final Office Action", U.S. Appl. No. 12/414,434, (Jan. 17, 2012), 7 pages.

"Non-Final Office Action", U.S. Appl. No. 12/414,434, (May 31, 2012), 7 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/433,667, (Jun. 7, 2011), 15 pages.

"Non-Final Office Action", U.S. Appl. No. 12/433,667, (Feb. 3, 2012), 16 pages.

"Non-Final Office Action", U.S. Appl. No. 12/469,419, (Nov. 9, 2011), 15 pages.

"Non-Final Office Action", U.S. Appl. No. 12/469,419, (May 23, 2012), 13 pages.

"Non-Final Office Action", U.S. Appl. No. 12/469,458, (Jul. 1, 2011), 15 pages.

"Non-Final Office Action", U.S. Appl. No. 12/469,480, (Sep. 22, 2011), 14 pages.

"Non-Final Office Action", U.S. Appl. No. 12/470,558, (Nov. 22, 2011), 9 pages.

"Non-Final Office Action", U.S. Appl. No. 12/484,799, (Aug. 11, 2011), 12 pages.

"Non-Final Office Action", U.S. Appl. No. 12/484,845, (Dec. 7, 2011), 16 pages.

"Non-Final Office Action", U.S. Appl. No. 12/560,081, (Dec. 7, 2011), 16 pages.

"Notice of Allowance", U.S. Appl. No. 12/414,382, (Apr. 4, 2012), 4 pages.

"Notice of Allowance", U.S. Appl. No. 12/414,455, (Jan. 4, 2012), 4 pages.

"Notice of Allowance", U.S. Appl. No. 12/414,458, (Oct. 31, 2011), 2 pages.

"Notice of Allowance", U.S. Appl. No. 12/414,458, (Nov. 29, 2011), 2 pages.

"Notice of Allowance", U.S. Appl. No. 12/414,458, (Aug. 10, 2011), 6 pages.

"Notice of Allowance", U.S. Appl. No. 12/470,558, (Apr. 2, 2012), 7 pages.

"Notice of Allowance", U.S. Appl. No. 12/484,845, (Mar. 16, 2012), 5 pages.

"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., (Dec. 1999), 8 pages.

"Oracle8i Application Developer's Guide—Advanced Queuing", Retrieved from: http://www.cs.umbc.edu/help/oracle8/server.815/a68005/03_adq1i.htm on May 6, 2009., (Feb. 1999), 29 Pages.

"Oracle8i Concepts Release 8.1.5", Retrieved from: http://www.cs.umbc.edu/help/oracle8/server.815/a67781/c16queue.htm on May 6, 2009., (Feb. 1999), 10 Pages.

"Palette Extender 1.0.2", Retrieved from: <http://palette-extender.en.softonic.com/symbian> on Nov. 6, 2008, (Jan. 21, 2003), 2 pages.

"Parallax Scrolling", Retrieved from: <http://en.wikipedia.ord/wiki/Parallax_scrolling> on May 5, 2009., (May 4, 2009), 3 Pages.

"PCT Search Report and Written Opinion", Application No. PCT/US2009/061382, (May 26, 2010), 10 pages.

"PCT Search Report and Written Opinion", Application No. PCT/US2009/061735, (Jun. 7, 2010), 11 pages.

"PCT Search Report and Written Opinion", Application No. PCT/US2010/028699, (Oct. 4, 2010), 10 pages.

"PCT Search Report and Written Opinion", Application No. PCT/US2010/028555, (Oct. 12, 2010), 10 pages.

"PCT Search Report and Written Opinion", Application No. PCT/US2010/034772, (Dec. 29, 2010), 12 pages.

"PCT Search Report and Written Opinion", Application No. PCT/US2010/038730, (Jan. 19, 2011), 8 pages.

"PCT Search Report", Application No. PCT/US2009/061864, (May 14, 2010),10 pages.

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.

"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, (Dec. 15, 2008), 3 pages.

"Symbian Applications", Retrieved from: <http://symbianfullversion.blogspot.com/2008_12_01_archive.html> on May 5, 2009., (Jan. 2009), 51 Pages.

"Touch Shell Free", Retrieved from: <http://www.pocketpcfreeware.mobi/download-touch-shell-free.html> on May 5, 2009., (Feb. 23, 2009), 2 Pages.

"Winterface Review", Retrieved from: <http://www.mytodayscreen.com/winterface-review/> Nov. 12, 2008. (Jul. 9, 2008), 42 pages.

"Womma", Retrieved from: <http://www.womma.org/blog/links/wom-trends/> on May 5, 2009., (2007), 70 Pages.

Beiber, Gerald et al., "Screen Coverage: A Pen-Interaction Problem for PDA's and Touch Screen Computers", In Proceedings of ICWMC 2007,(Mar. 2007), 6 pages.

Dolcourt, Jessica "Webware", Retrieved from: <http://news.cnet.com/webware/?categoryId=2010> May 5, 2009., (May 5, 2009), 13 Pages.

Gade, Lisa "Samsung Alias u740", Retrieved from: <http://www.mobiletechreview.com/phones/Samsung-U740.htm> on Nov. 20, 2008, (Mar. 14, 2007), 6 pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007), pp. 1-42.

Ha, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008, (Nov. 2004), 7 Pages.

(56) References Cited

OTHER PUBLICATIONS

Harrison, Richard "Symbian OS C++ for Mobile Phones Volume 3", Retrieved from: <http://www.amazon.co.uk/Symbian-OS-Mobile-Phones-Press/dp/productdescription/0470066415> on Oct. 23, 2008, Symbian Press,(Jun. 16, 2003), 4 pages.

Hickey, Andrew R., "Google Android has Landed; T-Mobile, HTC Unveil G1", Retrieved from: <http://www.crn.com/retail/210603348> on Nov. 26, 2008., (Sep. 23, 2008), 4 pages.

Kcholi, Avi "Windows CE .NET Interprocess Communication", Retrieved from http://msdn.microsoft.com/en-us/library/ms836784.aspx on Jul. 17, 2008., (Jan. 2004), 15 Pages.

La, Nick "Parallax Gallery", Available at <http://webdesignerwall.comtutorials/parallax-gallery/comment-page-1>,(Apr. 25, 2008), 16 pages.

Mann, Richard et al., "Spectrum Analysis of Motion Parallax in a 3D Cluttered Scene and Application to Egomotion", *Journal of the Optical Society of America A*, vol. 22, No. 9, Available at <http://www.cs.uwaterloo.ca/~mannr/snow/josa-mann-langer.pdf>, (Sep. 2005), pp. 1717-1731.

Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000), 5 Pages.

Mei, Tao et al., "Probabilistic Multimodality Fusion for Event Based Home Photo Clustering", Retrieved from: <http://ieeexplore.ieee.org//stamp/stamp/.jsp?tp=&arnumber=04036960.>, (Dec. 26, 2006), pp. 1757-1760.

Nordgren, Peder "Development of a Touch Screen Interface for Scania Interactor", *Master's Thesis in Computing Science*, UMEA University, Available at <http://www.cs.umu.se/education/examina/Rapporter/PederNorgren.pdf>,(Apr. 10, 2007), pp. 1-59.

Oliver, Sam "Potential iPhone Usability and Interface Improvements", Retrieved from: <http://www.appleinsider.com/articles/08/09/18/potential_iphone_usability_and_interface_improvements.html> on Nov. 12, 2008, AppleInsider,(Sep. 18, 2008), 4 pages.

Oryl, Michael "Review: Asus P527 Smartphone for North America", Retrieved from: <http://www.mobileburn.com/review.jsp?Id=4257> on Dec. 17, 2008., (Mar. 5, 2008), 1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007), 4 Pages.

Raghaven, Gopal et al., "Model Based Estimation and Verification of Mobile Device Performance", Available at http://alumni.cs.ucsb.edu/~raimisl/emsoft04_12.pdf.,(Sep. 27-29, 2004), 10 Pages.

Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008), 1 page.

Remond, Mickael "Mobile Marketing Solutions", Retrieved from: <http://www.mobilemarketindmagazine.co.uk/mobile_social_networking/> on May 5, 2009., (Apr. 28, 2009), 16 Pages.

Rice, Stephen V., et al., "A System for Searching Sound Palettes", *Proceedings of the Eleventh Biennial Symposium on Arts and Technology,*, Available at <http://www.comparisonics.com/FindSoundsPalettePaper.pdf>,(Feb. 2008), 6 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008), 16 pages.

Singh, Kundan et al., "CINEMA: Columbia InterNet Extensible Multimedia Architecture", Available at <http://www1.cs.columbia.edu/~library/TR-repository/reports/reports-2002/cucs-011-02.pdf>,(Sep. 3, 2002), 83 Pages.

Steinicke, Frank et al., "Multi-Touching 3D Data: Towards Direct Interaction in Stereoscopic Display Environments coupled with Mobile Devices", *Advanced Visual Interfaces (AVI) Workshop on Designing Multi-Touch Interaction Techniques for Coupled Public*, Available at <http://viscg.uni-muenster.de/publications/2008/SHSK08/ppd-workshop.-pdf.>,(Jun. 15, 2008), 4 Pages.

Suror, "PocketShield—New Screenlock App for the HTC Diamond and Pro", Retrieved from: <http://wmpoweruser.com/?tag=htc-touch-diamond> on Jun. 28, 2011, (Oct. 23, 2008), 2 pages.

Terpstra, Brett "Beta Beat: Grape, a New Way to Manage Your Desktop Clutter", Retrieved from: Beta Beat: Grape, a New Way to Manage Your Desktop Clutter on Jun. 28, 2011, (Apr. 14, 2009), 4 pages.

Vallerio, Keith S., et al., "Energy-Efficient Graphical User Interface Design", Retrieved from: <http://www.cc.gatech.edu/classes/AY2007/cs7470 fall/zhong-energy-efficient-user-interface.pdf>, (Jun. 10, 2004), pp. 1-13.

Wilson, Tracy V., "How the iPhone Works", Retrieved from: <http://electronics.howstuffworks.com/iphone2.htm> on Apr. 24, 2009, (Jan. 2007), 9 pages.

Wyatt, Paul "/Flash/the art of parallax scrolling", .net Magazine,(Aug. 1, 2007), pp. 74-76.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007), 2 Pages.

"Final Office Action", U.S. Appl. No. 12/469,458, (Oct. 11, 2013), 24 pages.

"Foreign Office Action", Chinese Application No. 200980142661.5, (Sep. 24, 2013), 8 Pages.

"Foreign Office Action", Chinese Application No. 201080015802.X, (Sep. 29, 2013), 11 Pages.

"Non-Final Office Action", U.S. Appl. No. 13/270,111, (Oct. 21, 2013), 9 pages.

"Non-Final Office Action", U.S. Appl. No. 13/418,884, (Sep. 30, 2013), 7 pages.

"Supplemental Notice of Allowance", U.S. Appl. No. 12/433,667, (Oct. 10, 2013), 2 pages.

"Foreign Office Action", Chinese Application No. 201080015728.1, (Oct. 29, 2013), 8 Pages.

"Foreign Office Action", Japanese Application No. 2012-503514, (Aug. 7, 2013), 5 pages.

"Non-Final Office Action", U.S. Appl. No. 12/414,476, (Oct. 25, 2013),18 pages.

"Non-Final Office Action", U.S. Appl. No. 12/480,969, (Oct. 29, 2013), 22 pages.

"Final Office Action", U.S. Appl. No. 12/414,476, Apr. 24, 2014, 19 pages.

"Floating Layer", Retrieved from <http://web.archive.org/web/20011025040032/http://www.echoecho.com/toolfloatinglayer.htm> on Apr. 15, 2014, Oct. 25, 2001, 9 pages.

"Foreign Notice of Allowance", JP Application No. 2012-503523, Oct. 24, 2013, 4 pages.

"Foreign Office Action", AU Application No. 2010260165, Mar. 25, 2014, 3 Pages.

"Foreign Office Action", AU Application No. 2010260165, May 1, 2014, 3 Pages.

"Foreign Office Action", JP Application No. 2012-516218, Mar. 6, 2014, 6 Pages.

"Non-Final Office Action", U.S. Appl. No. 12/560,081, Apr. 30, 2014, 25 pages.

"Notice of Allowance", U.S. Appl. No. 12/433,605, Apr. 25, 2014, 4 pages.

"Final Office Action", U.S. Appl. No. 12/414,476, (Apr. 8, 2013), 25 pages.

"Final Office Action", U.S. Appl. No. 12/469,480, (Apr. 10, 2013), 21 pages.

"Foreign Office Action", Chinese Application No. 200980142644.1, (Apr. 3, 2013), 10 pages.

"Foreign Office Action", Chinese Application No. 201080015728.1, (May 16, 2013), 10 pages.

"Foreign Office Action", Chinese Application No. 201080015788.3, (06/05/13), 12 Pages.

"Foreign Office Action", Chinese Application No. 201080023212.1, (Jun. 5, 2013), 8 pages.

"Introducing Application Styling for Windows Forms", *Infragistics Software Manual*, Version 7.3.20073.1043, (Nov. 2007), 95 pages.

"Non-Final Office Action", U.S. Appl. No. 12/469,458, (May 3, 2013), 21 pages.

(56) References Cited

OTHER PUBLICATIONS

"Non-Final Office Action", U.S. Appl. No. 12/480,969, (Apr. 4, 2013), 22 pages.
"Notice of Allowance", U.S. Appl. No. 12/433,667, (Jun. 25, 2013),14 pages.
"Notice of Allowance", U.S. Appl. No. 13/492,495, (Apr. 26, 2013), 5 pages.
"Final Office Action", U.S. Appl. No. 12/433,667, (Jan. 7, 2013), 17 pages.
"Final Office Action", U.S. Appl. No. 12/480,969, (Nov. 23, 2012), 18 pages.
"Foreign Office Action", Chinese Application No. 201080015728.1, (Dec. 26, 2012), 9 pages.
"Foreign Office Action", Chinese Application No. 201080015788.3, (Dec. 24, 2012), 10 pages.
"Foreign Office Action", Chinese Application No. 201080023212.1, (Dec. 5, 2012), 10 pages.
"Non-Final Office Action", U.S. Appl. No. 12/414,476, (Nov. 9, 2012), 22 pages.
"Non-Final Office Action", U.S. Appl. No. 12/433,605, (Jan. 11, 2013), 7 pages.
"Non-Final Office Action", U.S. Appl. No. 12/469,480, (Oct. 17, 2012), 16 pages.
"Non-Final Office Action", U.S. Appl. No. 13/492,495, (Dec. 19, 2012), 6 pages.
"Notice of Allowance", U.S. Appl. No. 12/469,419, (Nov. 27, 2012), 13 pages.
"Notice of Allowance", U.S. Appl. No. 12/484,799, (Oct. 22, 2012), 10 pages.
"Extended European Search Report", European Patent Application No. 09822736.6, (Dec. 18, 2012), 7 pages.
"Final Office Action", U.S. Appl. No. 12/469,458, (Feb. 1, 2013), 19 pages.
"Foreign Office Action", Chinese Application No. 200980142632.9, (Jan. 29, 2013), 11 pages.
"Foreign Office Action", Chinese Application No. 200980142661.5, (Jan. 21, 2013), 12 pages.
Crouch, Dennis "Smartphone Wars: Micron's Slide-to-Unlock Patent", (Jan. 30, 2013), 2 pages.
"Non-Final Office Action", U.S. Appl. No. 12/413,977, (Jul. 20, 2012),18 pages.
"Non-Final Office Action", U.S. Appl. No. 12/469,458, (Sep. 21, 2012), 14 pages.
"Non-Final Office Action", U.S. Appl. No. 12/480,969, (Aug. 7, 2012), 15 pages.
"Non-Final Office Action", U.S. Appl. No. 12/484,799, (Aug. 7, 2012), 13 pages.
"Non-Final Office Action", U.S. Appl. No. 13/492,495, (Sep. 17, 2012), 8 pages.
"Notice of Allowance", U.S. Appl. No. 12/414,434, (Aug. 17, 2012), 4 pages.
"Notice of Allowance", U.S. Appl. No. 12/470,558, (Aug. 23, 2012), 2 pages.
"Non-Final Office Action", U.S. Appl. No. 12/433,605, Nov. 6, 2013, 16 pages.
"Final Office Action", U.S. Appl. No. 12/469,480, Dec. 5, 2013, 24 pages.
"Foreign Office Action", MX Application No. MX/a/2011/012279, Jul. 4, 2013, 3 Pages.
"Foreign Office Action", JP Application No. 2011-533353, Nov. 26, 2013, 4 pages.
"Foreign Office Action", JP Application No. 2012-503515, Nov. 18, 2013, 5 Pages.
"Final Office Action", U.S. Appl. No. 13/418,884, Dec. 30, 2013, 8 pages.
"Corrected Notice of Allowance", U.S. Appl. No. 14/330,221, Feb. 2, 2015, 2 pages.
"Foreign Office Action", RU Application No. 2011151097, Dec. 9, 2014, 7 pages.
"Corrected Notice of Allowance", U.S. Appl. No. 13/270,111, Jun. 17, 2014, 2 pages.
"Corrected Notice of Allowance", U.S. Appl. No. 13/270,111, Jun. 23, 2014, 3 pages.
"Extended European Search Report", EP Application No. 10762120.3, Aug. 22, 2014, 9 pages.
"Final Office Action", U.S. Appl. No. 12/560,081, Aug. 25, 2014, 27 pages.
"Foreign Notice of Allowance", AU Application No. 2010234909, May 2, 2014, 3 pages.
"Foreign Notice of Allowance", CN Application No. 201080015802.X, Sep. 10, 2014, 6 Pages.
"Foreign Notice of Allowance", JP Application No. 2012-511905, Sep. 24, 2014, 4 pages.
"Foreign Notice of Allowance", JP Application No. 2012-516218, Nov. 4, 2014, 4 Pages.
"Foreign Notice of Allowance", RU Application No. 2011147058, May 23, 2014, 13 pages.
"Foreign Office Action", CN Application No. 201080015802.X, May 19, 2014, 7 Pages.
"Foreign Office Action", CN Application No. 201080027409.2, Aug. 5, 2014, 12 Pages.
"Intent to Grant", EP Application No. 10762112.0, Aug. 28, 2014, 5 Pages.
"Non-Final Office Action", U.S. Appl. No. 13/418,884, Jun. 16, 2014, 8 pages.
"Notice of Acceptance", AU Application No. 2010260165, Jun. 23, 2014, 3 Pages.
"Notice of Allowance", U.S. Appl. No. 13/418,884, Aug. 5, 2014, 4 pages.
"Notice of Allowance", U.S. Appl. No. 13/712,777, Jul. 2, 2014, 4 pages.
"Notice of Allowance", U.S. Appl. No. 14/330,221, Oct. 16, 2014, 7 pages.
Faaborg, "The Design Review Episode 2: Chromeless Browsing", Available at: http://vimeo.com/2836740, Jan. 15, 2009, 3 pages.
"Foreign Office Action", IL Application No. 215757, May 18, 2015, 6 Pages.
"Foreign Office Action", TW Application No. 98135986, Jun. 10, 2015, 13 Pages.
"Non-Final Office Action", U.S. Appl. No. 13/835,603, Jun. 26, 2015, 8 pages.
"Notice of Allowance", U.S. Appl. No. 12/560,081, Aug. 10, 2015, 15 pages.
"Extended European Search Report", EP Application No. 10778152.8, Apr. 14, 2015, 7 pages.
"Foreign Notice of Allowance", RU Application No. 2011151097, Feb. 26, 2015, 16 pages.
"Foreign Office Action", CN Application No. 201080027409.2, Apr. 20, 2015, 14 Pages.
"Foreign Office Action", EP Application No. 10790080.5, May 18, 2015, 6 Pages.
"Foreign Office Action", IL Application No. 214804, Mar. 12, 2015, 6 Pages.
"Non-Final Office Action", U.S. Appl. No. 13/776,533, May 19, 2015, 52 pages.
"Supplementary European Search Report", EP Application No. 10790080.5, Apr. 21, 2015, 3 pages.
"Foreign Office Action", Chinese Application No. 200980142632.9, (Jun. 14, 2013), 6 pages.
"Final Office Action", U.S. Appl. No. 12/433,605, (Jul. 17, 2013),13 pages.
"Foreign Office Action", Japanese Application No. 2012-503523, (Apr. 22, 2013), 5 Pages.
"Final Office Action", U.S. Appl. No. 12/480,969, (Jul. 24, 2013),19 pages.
"Supplemental Notice of Allowance", U.S. Appl. No. 12/433,667, (Aug. 1, 2013), 2 pages.
"Foreign Office Action", Chilean Application No. 2379-2011, (Jul. 3, 2013), 8 pages.

(56) References Cited

OTHER PUBLICATIONS

"Foreign Office Action", Chinese Application No. 200980142644.1, (Aug. 20, 2013), 9 Pages.

"Non-Final Office Action", U.S. Appl. No. 12/469,480, (Aug. 27, 2013), 22 pages.

"EP Search Report", European Application No. 10762112.0, (Aug. 2, 2013), 7 Pages.

"Foreign Office Action", Japanese Application No. 2011-533353, (Jul. 5, 2013), 9 Pages.

* cited by examiner

USER INTERFACE WITH PARALLAX ANIMATION

CROSS-REFERENCE

This application claims priority under 35 U.S.C §119(e) to U.S. Provisional Patent Application Ser. No. 61/107,945, filed Oct. 23, 2008, entitled "Mobile Device"; U.S. Provisional Patent Application Ser. No. 61/107,935, filed Oct. 23, 2008, entitled "Mobile Device"; and U.S. Provisional Patent Application Ser. No. 61/107,921, filed Oct. 23, 2008, entitled "Contextual Search" all of which are hereby incorporated by reference in their entirety. This application is a continuation of U.S. patent application Ser. No. 12/484,845, filed on Jun. 15, 2009, the disclosure of which is incorporated by reference herein.

BACKGROUND

User interfaces may use animation to provide a variety of information. For example, user interfaces may use animation to indicate an occurrence of an event (e.g., a user interaction), transition between information (e.g., scan a document), and so on. Often times, users come to associate particular information with a particular type of animation. For instance, a user may drag a slide bar button to display different information in a user interface. Accordingly, the user may associate the scan animation with the dragging the slide bar button, e.g., in a cause and effect relationship. However, the user may be confused when a particular type of animation is reused to convey different information that does not relate to the dragging of the slide bar.

SUMMARY

User interface animation techniques are described. In an implementation, an input is detected that has a velocity and is directed to one or more objects in a user interface. A presentation is generated responsive to the detection that includes a parallax animation of the one or more objects. The presentation that includes the parallax animation is displayed on the display device.

In an implementation, a mobile communication comprises a display device and a user interface module. The user interface module is configured to generate a user interface that includes objects for output on the display device, which is configured to detect a gesture. The user interface module is configured to associate an apparent distance with each object in the user interface from a screen included in the display device. The user interface module generates a presentation of the objects in response to detection of the gesture that has a direction and a velocity. The presentation is displayed so a first object that appears closer to the screen moves at a rate that is greater than that of a second object that appears farther away from the screen than the first object. The first object moves at the rate and in a direction that matches the tactile input's velocity and direction.

In an implementation, one or more computer-readable media comprise instructions that are executable to provide a user interface. The user interface is operable to generate a presentation that is animated. The presentation includes a plurality of objects that are available for selection. Each of the objects is included in a layer with other objects of a same object type. The presentation is displayed on a display device so a first object appears to move in parallax with respect to one or more of the other objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

User interfaces permit users to interact with various applications, information, and so on. User interfaces may include a plurality of objects that are visible and selectable by to a user to access additional information, which may include launching an application, "opening" a file, and so forth. Example objects include but are not limited to icons, shortcuts, banners, dialog boxes, buttons, menus, text tags, photographs, backgrounds, a pointer (e.g., an arrow), borders, and so forth. In addition, user interfaces may use animation to convey information, such as to indicate an input is received, or to provide information about an object.

After time, users may associate the animation with an underlying function. For example, a user may associate navigation through a document with a point-and-drag input. As a result, the user may become confused when the animation is reused to convey different information.

Parallax animation techniques are described, such as to indicate that information is associated with one or more objects presented in the user interface. For instance, the user interface may display a presentation having an animation in which one or more of the objects appear to move in parallax. The parallax motion may be used for a variety of functionality. For example, parallax motion may indicate that additional information is available for presentation in the user interface and express that the user interface has depth, e.g., a user may "dive-in" to the user interface to access information, such as through a transition to additional information.

In the following discussion, an example environment, systems, and a user interface are first described that are operable to perform parallax animation. Example procedures are then described that may be implemented using the example environment as well as other environments. Accordingly, implementation of the procedures is not limited to the environment and the environment is not limited to implementation of the procedures.

Example Environment

Figure 1:
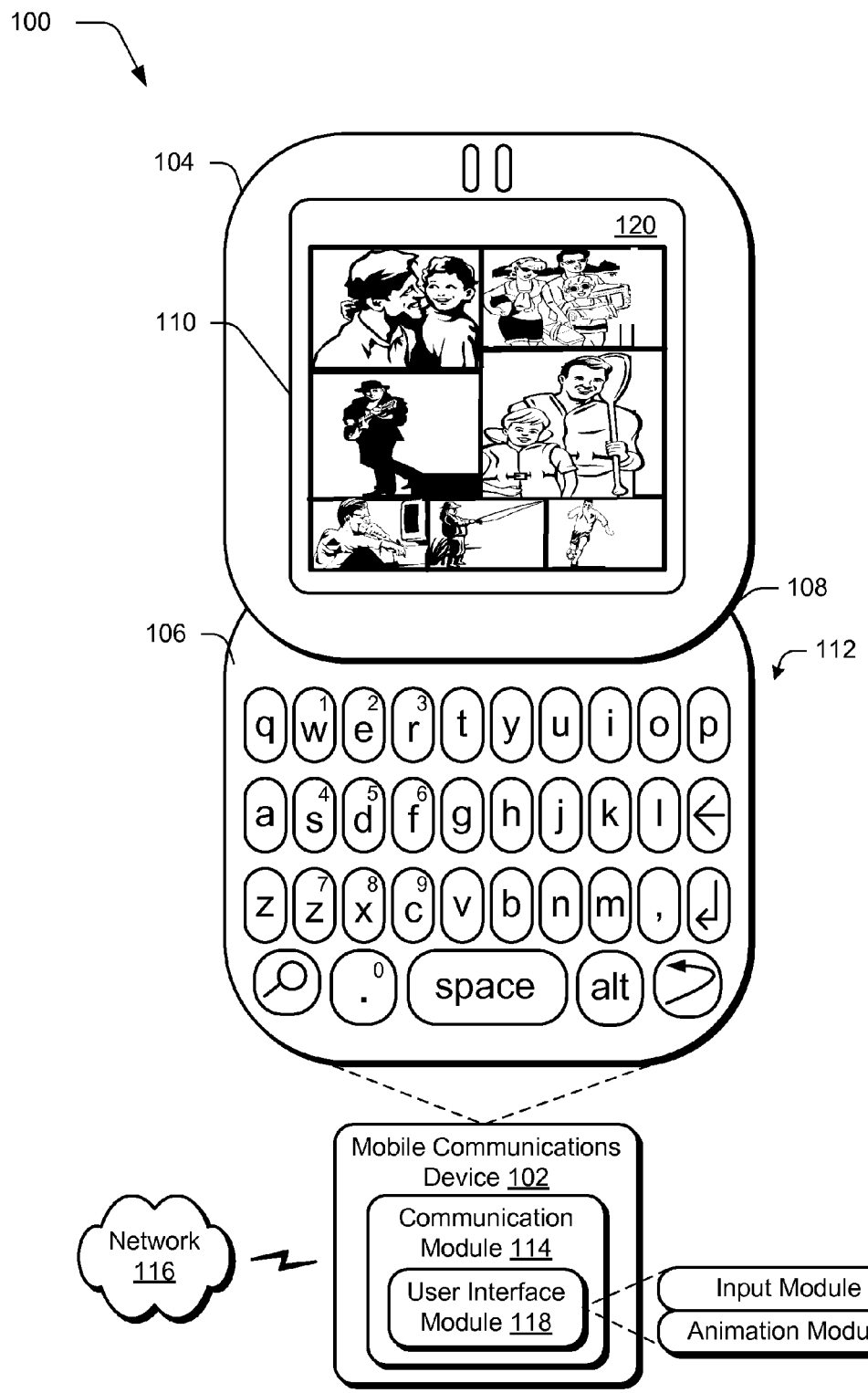
FIG. 1 is an illustration of an environment in an example implementation that is operable to implement parallax animation.

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration as illustrated in FIG. 1 in which the mobile communications device 102 is "open" and a configuration in which the mobile communications device 102 is "closed" as illustrated in FIGS. 2-3.

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of content, such as a caller identification (ID), contacts, images (e.g., photos) as illustrated, email, multimedia messages, Internet browsing, game play, music, video and so on. In an implementation, the display device 110 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may be used to detect gestures, further discussion of which may be found in relation to FIGS. 2-5.

The second housing 106 is illustrated as including a keyboard 112 that may also be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to capture content, form short message service (SMS) text messages, multimedia messaging service (MMS) messages, emails, status updates to be communicated to a social network service, and so on. A user, for instance, may input a status update for communication via the network 116 to a social network service. The social network service may then publish the status update to "friends" of the user, e.g., for receipt by the friends via a computer, respective mobile communications devices, and so on. A variety of other examples are also contemplated, such as blogging, instant messaging, and so on.

The mobile communications device 102 is also illustrated as including a user interface module 118. The user interface module 118 is representative of functionality of the mobile communications device 102 to generate, manage, and/or output a user interface 120 for display on the display device 110 that may employ parallax animation, e.g., parallax pan and scroll. The user interface 120, for example, may implement parallax animation techniques to indicate the availability of information that is associated with one or more objects that are visible in the user interface. Information may include information about an event (e.g., an input has been received), information that is associated with an object (e.g., pictures that are available to be viewed), and so on. For instance, the user interface may use parallax animation to express that an object includes information. This may permit the user to "dive-into" the user interface to transition between information.

As further illustrated, the user interface module 118 includes an input module 122 and an animation module 124. The input module 122 is representative of functionality to determine whether received inputs (e.g., via the touch screen) correspond to a function of the user interface 120. For instance, the input module 122 may check a table of inputs to determine whether an input corresponds to a function provided by the user interface 120 by determining a direction and/or velocity for the input and comparing data that describes this input to the table. The direction and velocity may be determined in a variety of ways, such as by interpreting signals received via an input device (e.g., a mouse, contact sensors in the touchscreen, and so on).

The animation module 124 is representative of functionally to generate a presentation in which the objects in the user interface 120 are animated so the objects move in a parallax manner. Thus, the animation may give an appearance of display of the object as seen from two or more different points that are not on a line with the object.

The animation module 124 may provide the presentation upon receipt of an input that corresponds to the parallax animation. For example, the objects included in the user interface may appear to pan or scroll in parallax in response to a drag input. The user interface may use parallax animation to indicate (e.g. provide a visual cue) that one or more of the objects is associated with information. Thus, the use of parallax animation in the user interface may convey a rich viewing experience to indicate the availability of information for display on the display device 110 and to transition between the information. Moreover, a user interface that implements parallax animation (e.g., parallax pan, parallax scroll) may help to minimize user confusion associated with the reuse of conventional animations in the user interface.

Generally, the functions described herein can be implemented using software, firmware, hardware (e.g., fixed logic circuitry), manual processing, or a combination of these implementations. The terms "module," "functionality," "service," and "logic" as used herein generally represent software, firmware, hardware, or a combination of software, firmware, or hardware. In the case of a software implementation, the module, functionality, or logic represents program code that performs specified tasks when executed on a processor (e.g., CPU or CPUs). The program code may be stored in one or more computer-readable memory devices (e.g., one or more tangible media), and so on. The structures, functions, approaches, and techniques described herein may be implemented on a variety of commercial computing platforms having a variety of processors.

In additional embodiments, a variety of devices may make use of the structures, techniques, approaches, modules, and so on described herein. Thus, although the mobile communications device 102 is described throughout this document, a variety of devices, such as personal computers, mobile computing devices, smart phones, personal digital assistants, laptops, and so on may make use of the described techniques, approaches, structures, and so on. The devices may be configured with limited functionality (e.g., thin devices) or with robust functionality (e.g., thick devices). Thus, a device's functionality may relate to the device's software or hardware resources, e.g., processing power, memory (e.g., data storage capability), and so on. Having discussed the example environment 100, parallax animation is now described in conjunction with sample user interfaces.

Figure 2A:
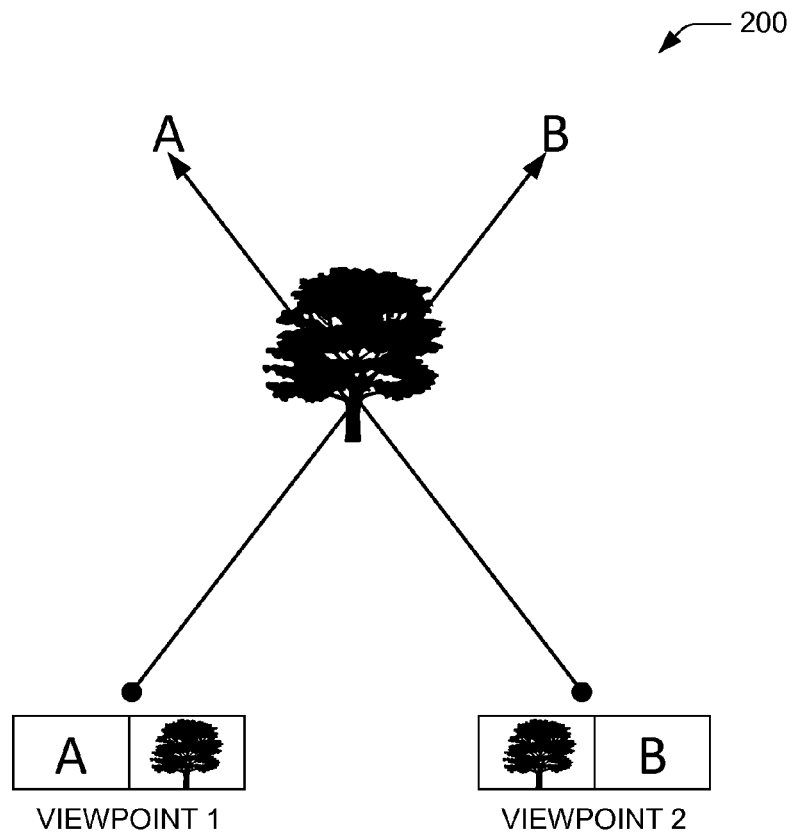
FIG. 2A is an illustration showing an example of parallax animation.
Figure 3:
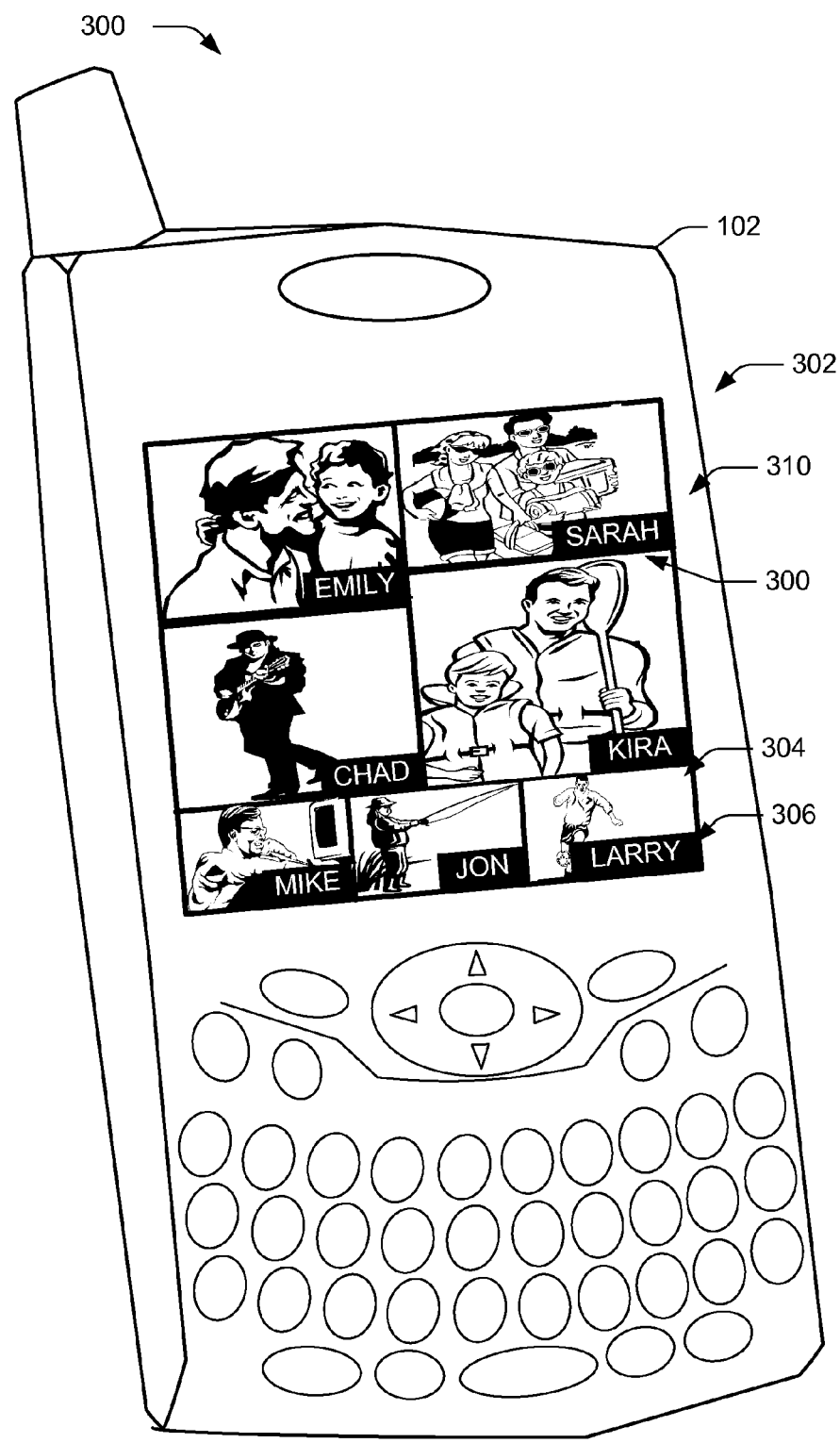
FIG. 3 is an illustration of a system in an example implementation showing a mobile communications device with a user interface configured to perform parallax animation.

FIG. 2A depicts an example illustration of a presentation 200 that includes a parallax animation. Parallax animation may cause objects in the user interface to move about a display device. Parallax animation in the illustrated example refers generally to motion in which objects that are closer to a viewpoint (e.g., a screen of the display device 110) move faster than objects that are farther away from the viewpoint.

In parallax animation, the perspective of the viewer may appear to move from a starting viewpoint to an ending viewpoint. Thus, when a user views a user interface that implements parallax animation (e.g., user interface 120), the user may perceive that an object in the background may shift when displayed with respect to an object in a mid-ground or foreground. As a result, the user may perceive that a first object that appears closer to the viewer (e.g., a screen in the display device 110) moves faster than a second object that appears farther away from the display device's screen.

In the illustrated example, as the viewpoint of the presentation 200 moves from viewpoint 1 to viewpoint 2, the first object (e.g., the tree in the mid-ground) and the background objects (e.g., objects A and B) appears to shift to reveal object B. Object A (also in the background) is also blocked by the tree as the displayed viewpoint moves from viewpoint 1 to viewpoint 2. The foregoing description and illustration are provided by way of example for use in understanding the modules, techniques, approaches, and so on described herein. In some instances, the user interface's parallax animation may be pinned to a point, e.g., a corner of the display device's screen. For example, corner pinning may be used so objects may appear to vanish toward a corner or edge of the screen.

In one or more embodiments, parallax animation is combined with other visual presentation techniques to increase the likelihood that a user "believes" that the objects are in motion. For example, objects in the background may be scaled to appear smaller than objects in the foreground, objects may overlay other objects (e.g., an opaque tag overlays a picture), and so on.

Figure 2B:
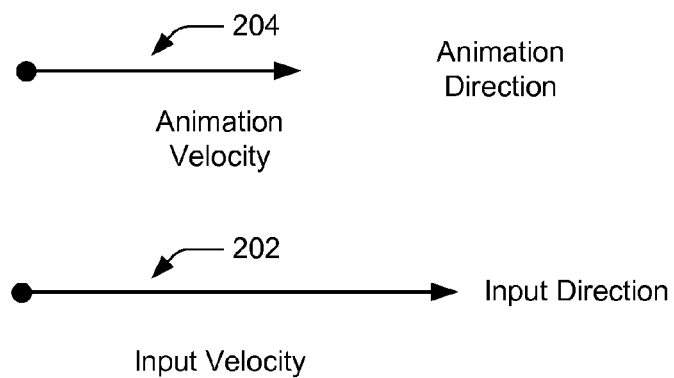
FIG. 2B is an illustration showing animation movement and direction that corresponds to an input.

FIG. 2B illustrates an example implementation of a user interface animation that corresponds to an input 202. An object that moves in parallax may move in a direction and at a velocity that is related to the input's direction and velocity. For example, the input 202 may correspond to a gesture that is received via the touchscreen functionality of the display device 110. The gesture has a direction and a velocity that correspond to the dragging the user's finger across the display device 110. The parallax animation corresponds to this gesture such that the objects "follow" the gesture using parallax movement.

Additionally, the velocity of the input 202 and an object's velocity (e.g., illustrated as an arrow 204) in the user interface may be proportionally related. For instance, the object may move at a velocity that is half the velocity of the input. In another instance, an object's velocity and movement matches the velocity of the input 202.

In further embodiments, some objects may move at a rate that matches the input's velocity while other objects that are appear further away from the surface of the display device 110 move at a rate that is related (e.g., proportional) to the input's velocity, e.g., 80% of the input velocity.

Additionally, the user interface may be configured so an object's velocity appears to slow down as the animation nears termination. For example, movement of the object may appear to dampen from an original velocity to where the object does not move. In this way, the object may appear to slow down as if acted on by gravity, e.g., as if the object was kicked.

In further instances, an object may bounce before the object's motion is terminated. For example, the object may bounce as if the object experienced an elastic collision with an immovable object, e.g., an edge of the display device 110. In one example, an object's bounce mimics an F-curve with a duration of approximately 1.7 seconds and an approximately one-tenth of a second bounce offset.

As illustrated in FIG. 3, an example system 300 is shown in which the mobile communications device 102 is shown as assuming a "brick" configuration and includes a user interface 302 (which may be the same or different from the user interface 120 of FIG. 1) that is configured to perform parallax animation. The user interface 302 includes objects, such as photographs (e.g., a photograph of Larry 304), title tags (e.g., a tag "Larry" 306), and borders, e.g., border 308. The user interface module 118 generates a presentation 310, for display in the user interface 302, in which the photographs, title tags, boards, and so on are displayed as part of a parallax animation.

For example, the photographs and title tags may move in parallax in response to an input (e.g., a user's finger against the display device 110) that is dragged across the display device 110. In this example parallax animation, the title tags move at a greater velocity than a velocity at which the photographs that are included in the user interface move, both of which occur as the input is received, e.g., the user's finger is moved.

In an implementation, the user interface module 118 generates the presentation to transition between information in the user interface, e.g., photographs in a "home screen." For example, one of the photographs may be associated with an update that is available for display in the user interface 302. Therefore, the parallax animation may be used to transition from the photographs to the update. A variety of other examples are also contemplated, such as to move between different screens of the user interface 302.

Figure 4:
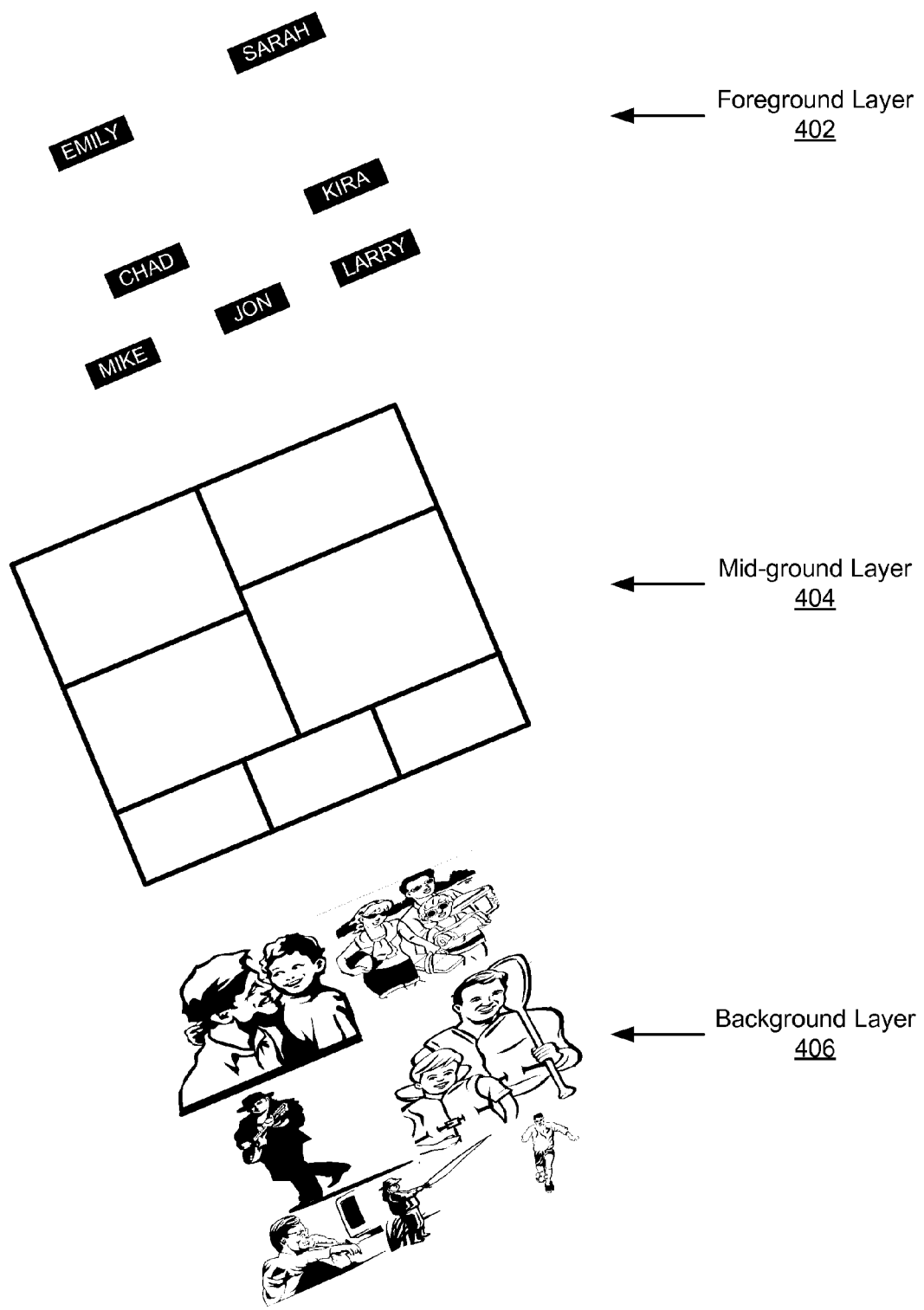
FIG. 4 is an illustration of the user interface of FIG. 3 that implements multiple motion layers that include a plurality of objects.

Reference will now be made to FIG. 4 in which the user interface 302 of FIG. 3 is illustrated in further detail. In the illustrated embodiment, the objects in the user interface 302 are associated with (e.g., included in) various layers to provide different amounts of motion. Example layers include but are not limited to a foreground layer 402, a mid-ground layer 404, and a background layer 406.

The layers may be used to define a corresponding behavior of the objects in the layer to output the parallax animation. For example, the background layer 406 (and consequently objects included in the background layer) may appear to move slower than objects in the foreground layer 402 or in the mid-ground layer 404. In an implementation, objects in the background (e.g., photographs) may move at a predetermined ratio to the input's velocity while name tags move at a matching velocity of the input, e.g., the dragging of the finger across the display device 110.

In one or more embodiments, objects are arranged into a particular one of the layers based on the object's type. In the illustrated example, photographs are included in the background layer 406 and tags (and other textual information) are included in the foreground layer 402. The mid-ground layer 404 is used to define borders in this example, although a variety of other examples are also contemplated.

Example Procedures

The following discussion describes procedures that may be implemented utilizing the previously described systems, techniques, approaches, services, and modules. Aspects of each of the procedures may be implemented in hardware, firmware, software, or a combination thereof. The procedures are shown as a set of blocks that specify operations performed by one or more devices (e.g., computers) and are not necessarily limited to the orders shown for performing the operations by the respective blocks. In portions of the following discussion, reference will be made to the environment 100 of FIG. 1 and the user interfaces of FIGS. 2-4.

Figure 5:
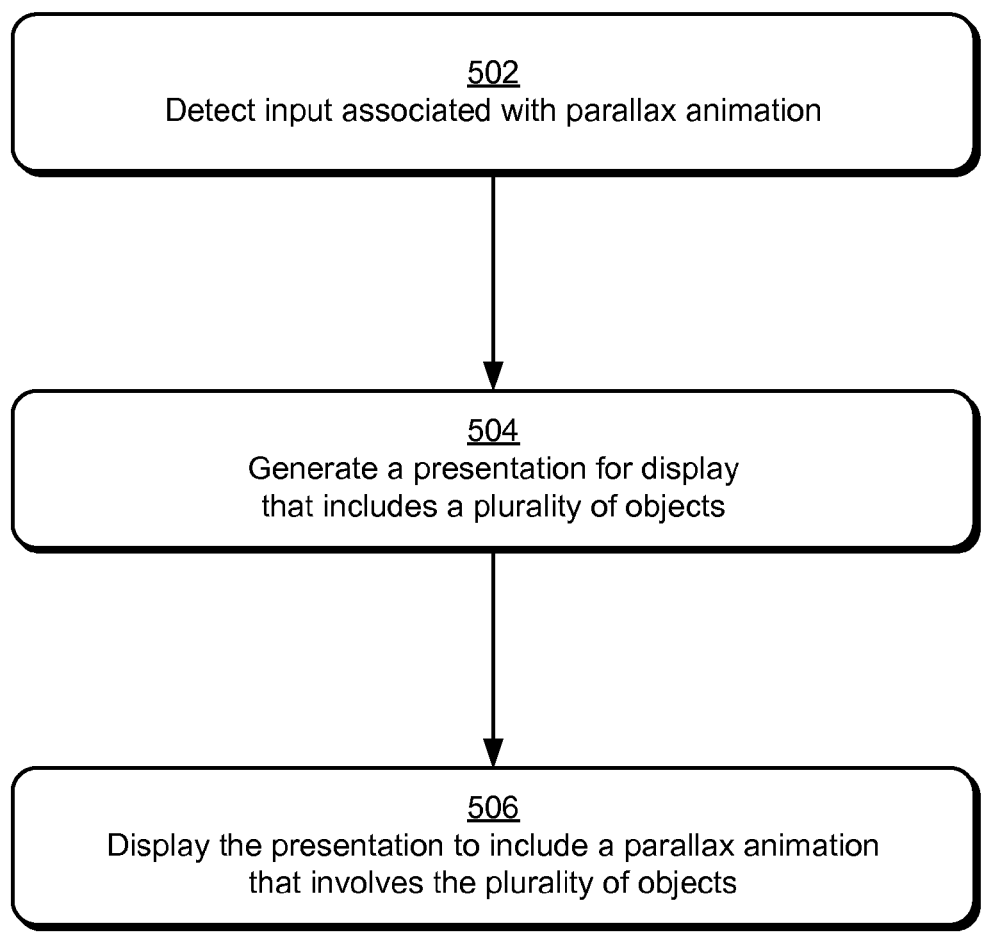
FIG. 5 is a flow diagram depicting a procedure in an example implementation involving parallax animation.

FIG. 5 depicts a procedure 500 in an example implementation in which parallax animation techniques are implemented to indicate information availability. An input is detected that is associated with parallax animation (block 502). As previously described, the input may be detected in a variety of ways, such as by using touchscreen functionality of the display device 110 of the mobile communications device 102, a touchpad, use of a cursor control device, and so on. For example, a gesture may be detected using touchscreen functionality of the display device 110 to pan between different screens of the user interface 120.

A presentation that includes a plurality of objects is generated (block 504) for display in a user interface. The presentation may include one or more objects that move in a direction and at a velocity that is related to an input that triggered generation and continued output of the presentation.

As previously described, the objects may be individually included in layers that are associated with an included object's location (e.g. background) and/or movement, e.g., slower or faster in comparison to other objects in the presentation. In some implementations, each object that corresponds to an object type is included in a common layer. For example, each photograph is included in a background layer while other types of objects are included in different layers as previously discussed in relation to FIG. 4.

The presentation is then displayed such that the objects exhibit parallax animation (block 506). Continuing with the previous example, one or more of the objects in the presentation may exhibit parallax motion, e.g., parallax pan and scroll, such that the objects may move in parallax as a user drags a finger across the display device 110. For instance, a user may drag a finger across the display device 110 to navigate between screens of the user interface. During this navigation, objects in the screen may be displayed in parallax. A variety of other examples are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving an input, the input comprising a velocity and a direction, that is directed to one or more objects displayed on a display device,
   generating a presentation that includes a parallax animation of the one or more objects in a plurality of layers based on object type; and
   displaying the presentation that includes the parallax animation on the display device, the parallax animation displaying such that a first layer of the plurality of layers consists of a text object type and a second layer of the plurality of layers consists of an image object type, the parallax animation configured to continue to be displayed after completion of the input.

2. A method as described in claim 1, wherein the presentation is displayed when at least one of the one or more objects is available for selection to access additional information for display in the user interface.

3. A method as described in claim 1, wherein the one or more objects include:
   a photograph;
   an icon;
   a shortcut;
   a label; or
   visual content.

4. A method as described in claim 1, wherein:
   the input is a gesture received via touchscreen functionality of the computer; and
   the displaying is performed so the one or more objects move in a direction of the gesture.

5. A method as described in claim 1, wherein the computer is configured as a mobile communications device that includes telephone functionality.

6. A method as described in claim 1, wherein each said layer is assigned a different speed in the parallax animation for moving respective said objects that are included in the layer.

7. A mobile communications device comprising:
   a display device having touchscreen functionality;
   one or more processors;
   one or more computer readable storage memory; and
   a user interface module embodied on the one or more computer readable storage memory and configured to be executed by the one or more processors to generate a user interface that includes objects for output on the display device, the user interface module being configured to:
      generate a presentation of the objects included in a respective one of a plurality of layers based on object type in response to detection of a gesture; and
      display the presentation including a parallax animation so that a first said layer of the plurality of layers consists of a text object type and second said layer of the plurality of layers consists of an image object type, the parallax animation configured to continue to be displayed after completion of the gesture.

8. A mobile communications device as described in claim 7, wherein a third said layer of the plurality of layers consists of:
   a label or
   a border.

9. A mobile communications device as described in claim 7, wherein the first said layer appears closer to the screen than the said second layer.

10. A mobile communications device as described in claim 7, wherein the gesture includes a pan-and-drag of a user's finger.

11. A mobile communications device as described in claim 7, wherein the parallax animation displays such that as the animation nears termination at least one of the one or more object's motion appears to dampen.

12. A mobile communications device as described in claim 7, further comprising one or more modules embodied on the one or more computer readable storage memory and configured to be executed by the one or more processors to provide telephone functionality and wherein the user interface includes objects that relate to the telephone functionality.

13. A mobile communications device configured to:
   provide, on the mobile communications device, a user interface;

generate a presentation for the user interface that includes a parallax animation to follow a gesture comprised of a velocity and direction, the parallax presentation including a plurality of objects in a respective one of a plurality of layers; and display the presentation on a display device of the mobile communications device to include the parallax animation, the parallax animation displaying such that at least one object type is text that is assigned to a first said layer of the plurality of layers consisting of text objects and another object type is images assigned to another said layer of the plurality of layers consisting of image objects, the parallax animation configured to continue to be displayed after completion of the gesture.

14. A mobile communications device as described in claim 13, wherein said objects included in a respective layer are perceived as having a different distance from a surface of the display device than other said objects in a different layer.

15. A mobile communications device as described in claim 13, wherein such that as the animation nears termination a least one of the plurality of object's motion appears to dampen.

16. A mobile communications device as described in claim 13, wherein the presentation is generated in response to detection of the gesture and a first said object is associated with information available for display in the user interface.

17. A mobile communications device as described in claim 16, wherein the first said object is an image associated with an update that is available for display in the user interface.

18. A mobile communications device as described in claim 13, wherein the parallax motion comprises further displaying at least one of the said objects appearing to bounce off an edge of the display device before the said object's motion is terminated.

19. A mobile communications device as described in claim 13, wherein the first said layer or the another said layer moves at a rate that matches the velocity of the gesture.

20. A mobile communications device as described in claim 13, wherein the first said layer and/or the another said layer moves at a rate that is proportional to the velocity of the gesture.

* * * * *